United States Patent [19]

Ross

[11] 4,423,004

[45] Dec. 27, 1983

[54] TREATMENT OF TANTALUM POWDER

[75] Inventor: Sidney D. Ross, Williamstown, Mass.

[73] Assignee: Sprague Electric Company, North Adams, Mass.

[21] Appl. No.: 478,384

[22] Filed: Mar. 24, 1983

[51] Int. Cl.³ .............................. B22F 1/00; B22F 1/02
[52] U.S. Cl. ........................................ 419/35; 419/30; 419/31; 419/34; 29/570; 361/433; 252/402
[58] Field of Search ...................... 419/30, 31, 34, 35; 29/570; 252/402; 361/433; 313/352, 355, 348

[56] References Cited

U.S. PATENT DOCUMENTS 3,152,893 10/1964 Storchheim ........................... 75/223
3,180,329  8/1963 Sherman ................................ 29/570
3,299,326  1/1967 Gluyas et al. ......................... 29/570
3,697,255 10/1972 Baldwin et al. .................. 75/0.5 AB

FOREIGN PATENT DOCUMENTS 615285 2/1961 Canada .
 951726 3/1964 United Kingdom .
1307149 2/1973 United Kingdom .
1525900 9/1978 United Kingdom .

*Primary Examiner*—Brooks H. Hunt
*Assistant Examiner*—Joel P. Okamoto

[57] ABSTRACT

Tantalum powder for electrolytic capacitors is treated with a non-aqueous solution of ammonium thiocyanate in N,N'-dimethylformamide or N-methylpyrrolidinone after the powder has been subjected to a thermal treatment in the absence of oxygen step and before the powder is exposed to an oxygen-containing fluid to prevent oxygen uptake by the powder. The thermal treatment step is carried out at 700° C. and above.

4 Claims, No Drawings

TREATMENT OF TANTALUM POWDER

BACKGROUND OF THE INVENTION

This invention relates to the treatment of tantalum powder for electrolytic capacitors to prevent oxygen uptake by the powder following thermal treatment in the absence of oxygen and before exposure to an oxygen-containing fluid, specifically air. The treatment involves contacting the powder with a non-aqueous solution of ammonium thiocyanate in N,N'-dimethylformamide or N-methylpyrrolidinone.

The oxygen concentration of tantalum powder destined to be used in making electrolytic capacitors is critical. When the total oxygen content of porous tantalum pellets is above approximately 4000 ppm, capacitors using such pellets as electrodes have unsatisfactory life characteristics.

Tantalum powder has a great affinity for oxygen, and the powder particles readily oxidize on exposure to air, particularly after a thermal treatment step. While technology exists to carry out all processing steps in an inert atmosphere, it is uneconomic to do so. A more viable approach is to prevent oxidation of the powder in at least one stage of its processing and thus reduce the total oxygen content in this manner.

SUMMARY OF THE INVENTION

It has been found that contacting tantalum powder, after it has been thermally treated in the absence of oxygen and before it has been exposed to an oxygen-containing fluid, with a non-aqueous solution of ammonium thiocyanate in an amide such as N,N-dimethylformamide (DMF) or N-methylpyrrolidinone (NMP) protects the powder from surface oxidation on exposure to an oxygen-containing fluid, e.g., air and water vapor.

It is believed that the ability of thiocyanate to protect fresh tantalum surfaces depends on the nucleophilic nature of thiocyanate, i.e., attraction for bare metal surfaces. Other molecules which have nucleophilic values close to thiocyanate are mecaptans and sulfides. Some of the stronger nucleophilic molecules contain oxygen, e.g., sulfite, thiosulfate, and orthomonothiophosphate, and these are felt to be undesirable because of the possibility of the oxygen portion attaching itself to the tantalum surface. Because of the malodorous nature of mercaptans and sulfides, thiocyanates were chosen for testing. As will be shown below, ammonium thiocyanate is the preferred one.

Not only was it believed that the nucleophilic agent be non-oxygenated, but also it was felt that the solvent should not contain reactive oxygen-containing groups, such as hydroxyl groups in water, alcohols, etc. While hydrocarbons have been used in the past as protective blankets during heat-treating, they can crack and produce carbon which is detrimental to final capacitor performance. Thiocyanate is also relatively insoluble in hydrocarbons, and it was decided to use as solvent a material known to be compatible with capacitors.

EXAMPLE 1

In order to evaluate whether thiocyanate will passivate tantalum powder surfaces and prevent oxidation on exposure to air, tantalum powder was heated at 700° C. for one hour in 50 mtorr of argon to dissolve most of the surface oxide in the powder. While still in an argon atmosphere, one-third of the powder was treated with a 15% solution of ammonium thiocyanate in dry DMF and one-third was treated with a 15% solution of potassium thiocyanate in dry DMF. The remaining third was not treated but was exposed to air.

After two hours with occasional stirring, the treated powder was exposed to the atmosphere, and excess solution was removed by suction filtration and then by pumping at 200 mtorr and 100°–125° C.

Four groups of pellets were made: Group A were made from powder as received (no heating); Group B, from the powder that was treated and exposed to air; Group C, from powder treated with ammonium thiocyanate; and Group D, from powder that was treated with potassium thiocyanate. The pellets were sintered at 1500° C. for 30 min., and then some were sintered for an additional 5 min. In the table below, Group A-1, B-1, etc., received only the 30 min. sinter, and Group A-2, B-2, etc., received the additional sinter. One-half of each group was anodized to 70 V, and the others to 100 V. Capacitances and leakage currents are given in $\mu F - V/g$ and $\mu A \times 10^{-4}/\mu F - V$ so they are directly comparable.

TABLE 1

| Group | 70V Capacitance | 70V Leakage | 100V Capacitance | 100V Leakage |
|---|---|---|---|---|
| A-1 | 15,590 | 1.6 | 15,050 | 2.4 |
| A-2 | 15,260 | 7.6 | 14,700 | 8.0 |
| B-1 | 15,970 | 2.4 | 15,270 | 2.9 |
| B-2 | 15,770 | 12.2 | 15,140 | 11.9 |
| C-1 | 15,360 | 4.3 | 14,830 | 4.4 |
| C-2 | 15,280 | 8.1 | 14,630 | 6.9 |
| D-1 | 15,780 | 40.4 | 14,860 | 57.4 |
| D-2 | 15,513 | 37.9 | 14,560 | 55.5 |

The use of potassium thiocyanate produced excessive leakage currents and is not desirable for this reason. Because of this degradation of capacitor performance, use of other alkali metal thiocyanates is not contemplated.

EXAMPLE 2

A second batch of powder was treated similarly, except that the temperature was raised to 900° C. to ensure complete solution of the surface oxygen in the tantalum, thus leaving an oxide-free surface. A 5% solution of ammonium thiocyanate in dried DMF was used. The other conditions were the same as in Example 1. Group E pellets received no initial heat treatment, but the 30 min. sinter created an oxide-free surface which reacted with oxygen on exposure to air, and this process of oxygen uptake was repeated after the second 5 min. sinter. Group F pellets were heat treated at 900° C. This resulted in oxygen uptake on exposure to air, and the two sinters resulted in two additional stages of oxygen uptake. Group G pellets were treated with ammonium thiocyanate solution after the first 900° C. treatment and before exposure to air. This prevented oxygen uptake on exposure to air, but the two sinter steps created oxygen free surfaces which resulted in oxygen uptake on exposure to air.

The results (oxygen levels in ppm) are shown in Table 2a. Each time the tantalum surface is bared and then exposed to air, the net result is a pickup of approximately 500 ppm of oxygen. Group E pellets had two such opportunities, the two sinters. Group F pellets had three, the initial heat treatment and the two sinters. Group G pellets were pressed with a binder and were additionally heated to 240° C. to remove the binder, and so there were four opportunities for oxygen pickup. Although binder removal is not a heat-treatment step as such, the thiocyanate is volatilized and thus bare metal is exposed.

The fact that the thiocyanate treatment did protect the tantalum surface after the first 900° C. treatment and through the binder removal process is highly significant. Oxygen concentrations in excess of 3200 ppm in capacitor pellets prior to anodization result in capacitors with highly undesirable properties—high leakage currents and greatly impaired life. In the typical manufacturing process pellets are pressed and sintered. A lead is then welded on and the pellets are resintered. There are thus two stages during which oxygen can be added, with the total pickup approximately 1000 ppm oxygen. Applying the thiocyanate treatment after the first sinter and before exposure of the pellets to the air atmosphere, then welding the leads and resintering, one eliminates one stage of oxygen pickup and the total pickup is cut in half to approximately 500 ppm oxygen.

TABLE 2a

| Sample | Oxygen in ppm | | |
|---|---|---|---|
| | E | F | G |
| As received | 2800 | 2800 | 2800 |
| After binder removal | — | — | 2900 |
| After 30 min sinter | 3400 | 3700 | 3500 |
| After added 5 min | 3900 | 4200 | 3900 |
| Total change | 1100 | 1400 | 1100 |

Table 2b shows the effect of this oxidation on leakage currents with the E-1, F-1 and G-1 samples being measured after the 30 min sinter and the E-2, etc., samples after the additional 5 min sinter.

TABLE 2b

| Sample | 70V | | 100V | |
|---|---|---|---|---|
| | Capacitance | Leakage | Capacitance | Leakage |
| E-1 | 15,900 | 1.8 | 15,000 | 4.5 |
| E-2 | 15,500 | 28.0 | 14,700 | 27.0 |
| F-1 | 16,500 | 20.0 | 15,600 | 17.0 |
| F-2 | 16,100 | 34.0 | 15,200 | 33.0 |
| G-1 | 14,200 | 4.9 | 13,800 | 4.6 |
| G-2 | 14,000 | 29.0 | 13,400 | 32.0 |

While DMF had been used in the examples, other amides such as N-methylpyrrolidinone and higher boiling amides may be used. As noted earlier, ammonium thiocyanate is not readily soluble in non-hydroxylic solvents. The limitations on solvent choice are governed by solubility of the ammonium thiocyanate and by solvent type (no reactive oxygenated groups).

I claim:

1. A process for treating tantalum powder for electrolytic capacitors comprising contacting the powder after a thermal treatment in the absence of oxygen step at 700° C. and above and before exposure to an oxygen-containing fluid with a nonaqueous solution of ammonium thiocyanate in an amide solvent to passivate said powder to oxygen pickup on exposure to said oxygen-containing fluid.

2. A process according to claim 1 wherein said oxygen-containing fluid is air.

3. A process according to claim 1 wherein said amide is N,N'-dimethylformamide.

4. A process according to claim 1 wherein said amide is N-methylpyrrolidinone.

* * * * *